March 29, 1966  F. SINGER  3,242,839
PHOTOGRAPHIC OBJECTIVE SHUTTER
Filed Feb. 17, 1964
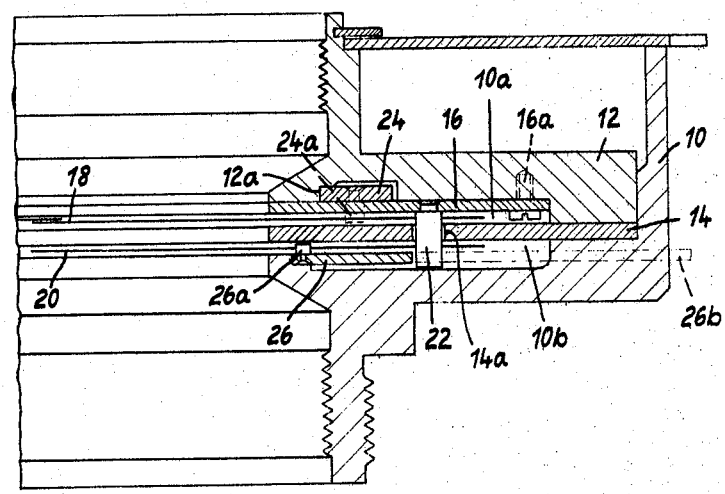

United States Patent Office 3,242,839
Patented Mar. 29, 1966

3,242,839
PHOTOGRAPHIC OBJECTIVE SHUTTER
Franz Singer, Munich, Germany, assignor to Compur-Werk Gesellschaft mit beschränkter Haftung & Company, Munich, Germany, a company of Germany
Filed Feb. 17, 1964, Ser. No. 345,349
Claims priority, application Germany, Mar. 4, 1963, C 10,254
5 Claims. (Cl. 95—63)

This invention relates to a photographic objective shutter having a shutter housing with a base plate secured in the housing, these two elements together defining at least one annular space in which are arranged the shutter blades and the diaphragm blades.

It is generally the object of this invention to provide a shutter construction which is simple and easy to produce, resistant to shock and stress, and economical in constructional parts and methods.

More specifically, it is an object of this invention to provide a shutter construction of the previously mentioned type wherein a plurality of mounting pins or supports are arranged in the housing so as simultaneously to serve as common rotary or guide axes for the shutter blades and the diaphragm blades, while also bridging an annular space in the housing so as to reinforce the light metal parts of the housing.

The foregoing objects are generally accomplished in the instant invention by the provision of mounting pins located in an annular space extending from the base plate to the shutter housing of the shutter construction, these mounting pins being parallel to the optical axis and serving as a common rotary or guide axis for the shutter blades and diaphragm blades.

A further advantageous feature of the invention lies in the provision of a mounting ring to which the mounting pins are riveted, the mounting ring being rigidly connected to the base plate of the shutter construction.

In accordance with yet another feature of the invention, a spacing ring is arranged between the base plate and the shutter housing to divide the annular space between these parts of the housing into two mutually separated annular gaps or spaces, this ring having openings for the passage of the mounting pins.

Other and further objects, advantages and features of the invention will be apparent from the following description of an exemplary embodiment with reference to the drawing, wherein there is shown a section view of one construction in accordance with the invention.

The drawing generally represents a known form of blade shutter the mechanisms of which are accommodated in a shutter housing 10 of light metal. A spacing ring 14 is inserted between this shutter housing 10 and a base plate 12, likewise of light metal and arranged in the interior of the shutter, thereby defining annular spaces 10a and 10b. The parts 12 and 14 are rigidly connected to one another and to the shutter housing 10, for instance, by screws (not shown). In addition a mounting ring 16 is connected to the base plate 12 by means of screws 16a. A plurality, for example five, shutter blades 18 and diaphragm blades 20 are arranged in the annular spaces 10a and 10b, respectively.

A plurality of mounting pins 22, five in this particular example, are riveted into the mounting ring 16, only one mounting pin being shown in the drawing for the sake of simplicity. These mounting pins 22 are of such length as to project rearwards through openings 14a in the spacing ring 14 and to extend substantially to the rear wall of the shutter housing, or to bear against the latter. The mounting pins 22 serve as fixed mounting points for the shutter blades 18 and the diaphragm blades 20.

A blade driving ring 24 is mounted so as to be movable around the optical axis in a groove 12a between the base plate 12 and the mounting ring 16. The shutter blades 18 are given a reciprocating movement on the mounting pins 22 for the purpose of opening and closing the objective aperture by means of driving pins 24a secured to the blade driving ring 24 and passing through appropriate openings in mounting ring 16 to engage in corresponding control slots (not shown) in the blades 18. The blade driving ring 24, is in turn reciprocated by a form of main driving member which is well known in the art, and accordingly which is not illustrated in the drawing.

A diaphragm operating ring 26 is mounted in the shutter housing 10 for rotation about the optical axis for the purpose of adjusting the diaphragm blades 20, this ring 26 having operating pins 26a. The operating pins 26a engage in corresponding operating openings or slots (not shown) in the diaphragm blades 20 so that movement of the operating ring 26 produces an adjusting movement of the blades 20. The diaphragm operating ring 26 may have a radial arm 26b which projects from the periphery of the shutter housing 10 and which may be coupled to a diaphragm setting ring (not shown).

The arrangement of mounting pins 22 so as to provide common mounting axes for the shutter blades 18 and the diaphragm blades 20, and the dimensioning of these pins in such a way that they reach from the base plate 12 to the rear wall of the shutter housing 10, is advantageous for several reasons. For instance, the mounting pins 22 serve as struts or bridge pieces between the base plate 12 and the shutter housing 10 and prevent bending of the base plate 12 when heavy lenses are mounted in the front objective tube. From this it follows that the shutter can be subjected to heavier stress by the rocking moments of heavy objective lenses without fear of the shutter blades 18 and/or the diaphragm blades 20 being jammed as a consequence of bending of the light metal parts of the housing and thus being obstructed in their proper functioning. Of course a gap between the free end of pin 22 and the rear wall of the shutter housing may result from a sum of the manufacturing tolerances. However, by reasonably controlling the tolerances this gap is always less than the degree of bending which can be performed by the base plate within its elastic limits. In addition to their bracing or reinforcing function, the mounting pins 22 transfer inadvertent shocks which may be sustained frontally to the shutter directly through the rear wall of the shutter housing 10 to the camera (not shown). Finally, since the mounting pins 22 function as common mounting or guide axes for the shutter blades 18 and diaphragm blades 20 there is also an economy of constructional parts and general constructional expense.

It will be apparent to those skilled in the art that the particular embodiment of the invention shown in the drawing and described herein is susceptible of various modifications without departing from the spirit of the invention. Accordingly, it should be understood that what I claim as new and desire to protect by Letters Patent is as set forth in the subjoined claims as interpreted in the light of the foregoing specification. Having thus described my invention in the manner required by the patent statutes,

I claim:

1. A photographic objective shutter comprising a shutter housing, a base plate secured in said shutter housing and defining an annular space with a wall portion of said shutter housing, means provided on said base plate for mounting lens means, a plurality of shutter blades and diaphragm blades disposed at least partially in said annular space, and a plurality of fixed mounting pins disposed in said annular space parallel to the optical axis of said housing and extending through said diaphragm blades and said shutter blades from said base plate to said wall of said shutter housing to serve as struts between said base plate and said shutter housing and thus prevent bending of said base plate when heavy lens means are mounted on said base plate, and to guide the movements of said shutter blades and diaphragm blades.

2. A photographic objective shutter as set forth in claim 1 further comprising a mounting ring connected to said base plate, and wherein said mounting pins are riveted to said mounting ring.

3. A photographic objective shutter as set forth in claim 1 further comprising a spacing ring disposed between said base plate and said shutter housing and dividing said annular space into first and second separated annular spaces, said spacing ring having openings therethrough for the passage of said mounting pins.

4. A photographic objective shutter as set forth in claim 3 wherein said diaphragm blades are disposed in different ones of said first and second annular spaces from said shutter blades.

5. A photographic objective shutter comprising a shutter housing, a base plate secured in said housing and defining an annular space with said shutter housing, means provided on said base plate for mounting lens means, the axis of said annular space being substantially parallel to the optical axis of said shutter housing, a plurality of shutter blades and diaphragm blades disposed at least partially in said annular space for movement transversely of the optical axis of said shutter housing, and a plurality of fixed mounting pins disposed in said annular space parallel to the optical axis of said housing and extending across said annular space from said base plate to said shutter housing to serve as struts between said base plate and said shutter housing and thus prevent bending of said base plate when heavy lens means are mounted on said base plate, each of said mounting pins passing through at least one of said shutter blades and one of said diaphragm blades to serve as a guide axis for movement of said blades.

References Cited by the Examiner
UNITED STATES PATENTS
961,192    6/1910    Wollensak _____ 95—63

JOHN M. HORAN, *Primary Examiner.*